(12) United States Patent
Park et al.

(10) Patent No.: US 9,087,618 B2
(45) Date of Patent: Jul. 21, 2015

(54) SOLIDIFICATION METHOD OF RADIOACTIVE WASTE ACCOMPANYING CHLORIDE RECYCLING OR RADIOACTIVE IODIDE REMOVING AND THE DEVICE THEREOF

(75) Inventors: Hwan Seo Park, Daejeon (KR); Byung-Gil Ahn, Daejeon (KR); Hwan-Young Kim, Daejeon (KR); In-Tae Kim, Daejeon (KR); Yung-Zun Cho, Daejeon (KR); Hansoo Lee, Daejeon (KR)

(73) Assignees: Korea Atomic Energy Research Institute, Daejeon (KR); Korea Hydro and Nuclear Power Co., LTD, Seoul (KR)

( * ) Notice: Subject to any disclaimer, the term of this patent is extended or adjusted under 35 U.S.C. 154(b) by 709 days.

(21) Appl. No.: 13/334,941

(22) Filed: Dec. 22, 2011

(65) Prior Publication Data
US 2012/0165594 A1 Jun. 28, 2012

(30) Foreign Application Priority Data
Dec. 23, 2010 (KR) .................. 10-2010-0133215

(51) Int. Cl.
G21F 9/30 (2006.01)
C02F 1/76 (2006.01)
(52) U.S. Cl.
CPC ........ *G21F 9/30* (2013.01); *G21F 9/305* (2013.01); *C02F 1/76* (2013.01)
(58) Field of Classification Search
None
See application file for complete search history.

(56) References Cited

U.S. PATENT DOCUMENTS 3,365,578 A * 1/1968 Grover et al. ............. 250/493.1
3,469,936 A * 9/1969 Chilenskas et al. ........... 423/260
3,644,104 A * 2/1972 Manevy et al. .................. 423/3
(Continued)

FOREIGN PATENT DOCUMENTS

GB 726531 * 8/1994
RU 221749 * 2/2002

OTHER PUBLICATIONS

Ebert et al. (2002), "The precision of product consistency tests conducted with a glass-bonded ceramic waste form", Journal of Nuclear Materials 305, pp. 37-51.
(Continued)

*Primary Examiner* — Melvin C Mayes
*Assistant Examiner* — Sheng H Davis
(74) *Attorney, Agent, or Firm* — Lathrop & Gage LLP

(57) ABSTRACT

The present invention relates to a method and apparatus for solidifying radioactive waste accompanying chlorine recycling or radioactive iodine removal. The present invention provide a method and apparatus for treating radioactive waste composed of volatile metal halide with high corrosiveness at a high temperature through a solidifying system including crushing, mixing/dehalogenating and sintering. In the inventive method and apparatus for solidifying radioactive waste, a dechlorination process by using a dehalogenation material is performed on highly corrosive metal salt under an oxidizing atmosphere by using a method of controlling a temperature on the surface of a reactor, and solidification is carried out by removing radioactive iodine while reusing chlorine contained in an exhaust gas. Accordingly, the generated amount of total waste can be reduced, and therefore the inventive method and apparatus can be usefully used in preparing a solidified body with high durability.

24 Claims, 10 Drawing Sheets

(56) References Cited

U.S. PATENT DOCUMENTS

| | | | |
|---|---|---|---|
| 4,534,893 A * | 8/1985 | Dippel et al. | 588/11 |
| 5,807,528 A * | 9/1998 | Nakano et al. | 423/213.2 |
| 6,124,518 A * | 9/2000 | Rasmussen | 588/316 |
| 6,320,091 B1 * | 11/2001 | Ebbinghaus et al. | 588/10 |
| 8,262,950 B1 * | 9/2012 | Nenoff et al. | 252/625 |
| 2005/0167861 A1 * | 8/2005 | Vandergheynst et al. | 264/0.5 |
| 2010/0126874 A1 * | 5/2010 | Watanabe et al. | 205/354 |
| 2010/0317911 A1 * | 12/2010 | Ahn et al. | 588/10 |

OTHER PUBLICATIONS

Lambregts et al. (2003), "Characterization of cesium containing glass-bonded ceramic waste forms," Microporous and Mesoporous Materials 64 pp. 1-9.

Lavrinovich et al. (2003), "Vitrification of Chloride Wastes in the Pyroelectrochemical Method of Reprocessing Irradiated Nuclear Fuel", Atomic Energy, vol. 95, No. 5, pp. 781-785.

Lavrinovich et al. (2006), "Combined Vitrification of Chloride and Phosphate Wastes by Pyroelectrochemical Reprocessing of Nuclear Fuel", Atomic Energy, vol. 101, No. 6, pp. 894-896.

Lexa et al. (2000), "On the reactive occlusion of the (uranium trichloride + lithium chloride + potassium chloride) eutectic salt in zeolite 4A", Journal of Nuclear Materials 279, pp. 57-64.

Morss et al. (2000), "Cerium, uranium, and plutonium behavior in glass-bonded sodalite, a ceramic nuclear waste form", Journal of Alloys and Compounds 303-304, pp. 42-48.

Richmann et al. (2001), "EXAFS/XANES studies of plutonium-loaded sodalite/glass waste forms", Journal of Nuclear Materials 297, pp. 303-312.

* cited by examiner

Fig. 5
PHOTOGRAPHS OF SOLIDIFIED BODIES USING BOROSILICATE GLASS
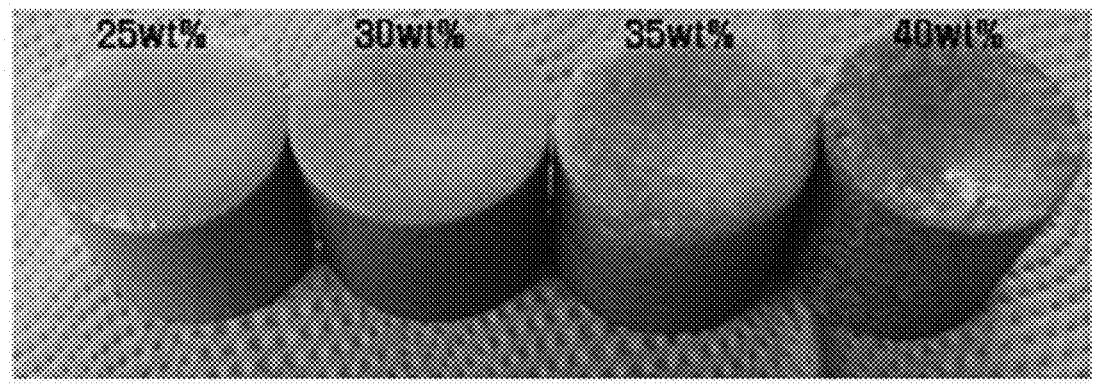
PHOTOGRAPHS OF SOLIDIFIED BODIES USING LEAD PHOSPHATE GLASS
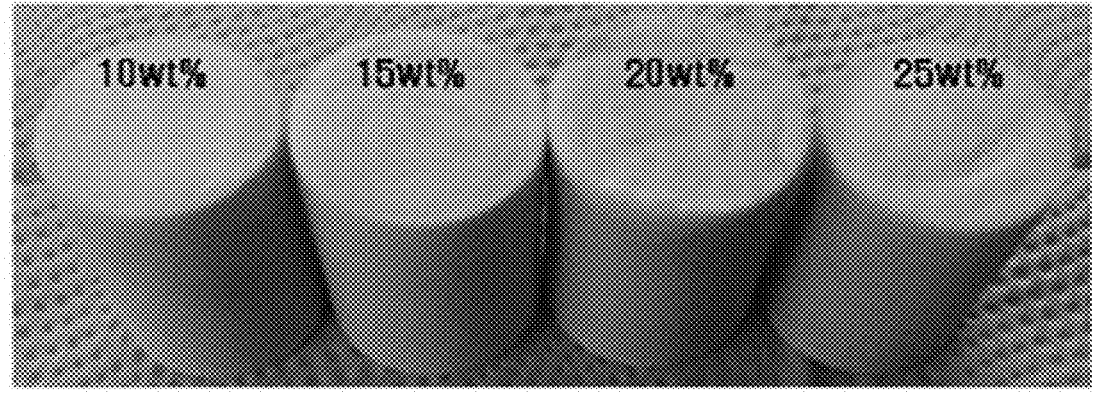
PHOTOGRAPHS OF SOLIDIFIED BODIES WITHOUT USE OF GLASS
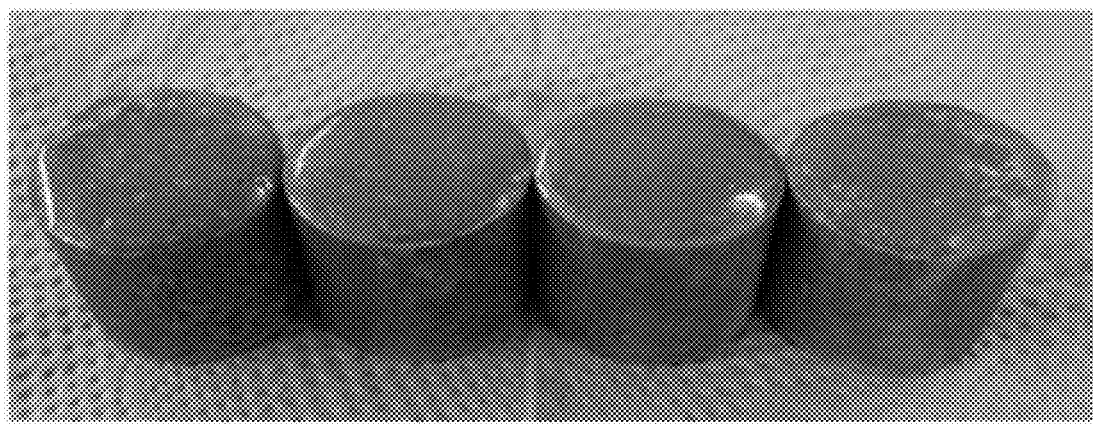

SOLIDIFICATION METHOD OF RADIOACTIVE WASTE ACCOMPANYING CHLORIDE RECYCLING OR RADIOACTIVE IODIDE REMOVING AND THE DEVICE THEREOF

CROSS-REFERENCES TO RELATED APPLICATION

This patent application claims the benefit of priority from Korean Patent Application No. 10-2010-0133215, filed on Dec. 23, 2010, the contents of which are incorporated herein by reference.

BACKGROUND OF THE INVENTION

1. Field of the Invention

The present invention relates to a method and apparatus for solidifying radioactive waste accompanying chlorine recycling or radioactive iodine removal.

2. Description of the Related Art

During the recovery of uranium and transuranic elements using an electrochemical method after nuclear fuel is used, metal halide is used as an electrolyte which contains a fission product and a small amount of actinide. Therefore, the used nuclear fuel is very harmful to the natural environment, and thus should be isolated from the outdoor environment and controlled in a specific repository over a long duration in consideration of its radioactive half-life until its harmful effects disappear.

Since such radioactive waste is highly soluble in water and volatilized at a high temperature of 610° C. or higher, it is difficult to directly apply typical solidification techniques and is also not easy to secure nuclide immobilization. To lower solubility and reduce volatile properties, radioactive metal chloride should be converted to a specific compound which is insoluble and non-volatile. At this time, a material which may react with all types of radioactive metal chlorides should be used as a reactant, and the reaction process should be carried out simply to reduce the generated amount of secondary radioactive waste.

According to a method suggested by the ANL in the USA (Lexa, D., Leibowitz, L., Kropf, J. On the reactive occlusion of the (uranium trichloride+lithium chloride+potassium chloride) eutectic salt in zeolite 4A. J. Nucl. Mater. 2000, 279, 57-64; Lambregts, M., Frank, S. M. Characterization of cesium containing glass-bonded ceramic waste forms. Microporous. Mesoporous. Mater. 2003, 64, 1-9; Ebert, W. L., Lewis, M. A., Johnson, S. G. The precision of product consistency tests conducted with a glass-bonded ceramic waste form. J. Nucl. Mater. 2002, 305, 37-51; Morss, L. R., Lewis, M. A., Lichmann, M. K., Lexa, D. Cerium, uranium, and plutonium behavior in glass-bonded sodalite, a ceramic nuclear waste form. J. Alloy. Compd. 2000, 303-304, 42-48; Lichmann, M. K., Reed, D. T., Kropf, A. J., Aase, S. B., Lewis, M. A. EXAFS/XANES studies of plutonium-loaded sodalite/glass waste forms. J. Nucl. Mater. 2001, 297, 303-312), 10 wt % of molten salt waste and 90 wt % of zeolite are mixed and included at a medium temperature (about 550° C.); 33.3 wt % of borosilicate glass is then added; and thereafter the resulting mixture is thermally treated at about 915° C. to convert radioactive metal chloride to sodalite existing in zeolite. According to the above-described method, the final solidified body has a very large volume and the sodalite structure is collapsed at a high temperature of 915° C. or higher, and thus there is a limitation in terms of temperature.

Also, the SRINR in Russia (Lavrinovich et al., Vitrification of chloride waste in the pyroelectrochemical method of reprocessing irradiated nuclear fuel, Atom. Energy. 2003, 95(5), 781-785; Lavrinovich et al., Combined vitrification of chloride and phosphate waste by pyroelectrochemical reprocessing of nuclear fuel, Atom. Energy. 2006, 101(6), 894-896), suggests a method for immobilizing radioactive chloride into a glass medium at about 950° C. by using phosphate glass is proposed; however, this method still has a disadvantage in that the durability of the solidified body is poor.

The above methods relate to a method of finally disposing all the wastes generated by immobilizing chlorine (Cl) into the solidified body, and are thus problematic in that the disposal volume of the radioactive waste is greatly increased. Also, since Cl, which is a non-radioactive element, is also immobilized, Cl should be continuously supplemented by an amount as much as the amount of discharged metal chloride.

That is, since Cl is disposed as being immobilized with radioactive nuclide, the above methods lead to the problem in which reduced waste loading or the use of a glass medium with low durability is required. Also, the above methods cause other problems in which the total volume of the waste increases and the economy of disposal decreases because Cl should be continuously supplemented.

The present inventors, therefore, solved the problem regarding solidification, and developed a method and apparatus for solidifying radioactive waste accompanying chlorine recycling or radioactive iodine removal, in which the amount of waste is minimized by reducing the total volume of the waste, and finally completed the present invention.

SUMMARY OF THE INVENTION

One object of the present invention is to provide a method for solidifying radioactive waste accompanying chlorine recycling or radioactive iodine removal.

Another object of the present invention is to provide an apparatus for solidifying radioactive waste accompanying chlorine recycling or radioactive iodine removal.

In order to achieve the objects, the present invention provides a method for solidifying a radioactive waste accompanying chlorine recycling or radioactive iodine removal, the method including: firstly crushing a radioactive waste ingot (Step 1); secondly crushing the radioactive waste crushed in Step 1 (Step 2); mixing a radioactive waste powder obtained by crushing the radioactive waste in Step 2 with a dehalogenating material to generate a halogen gas (Step 3-1); recovering the halogen gas generated in Step 3-1 in the form of a metal halide by using an adsorbent material (Step 3-2); again recovering a residual halogen gas in the form of a metal halide by using molten alkali metal carbonate (Step 3-3), after recovering the halogen gas in the form of the metal halide in Step 3-2; and sintering a remaining material (Step 4), after the halogen gas is volatized in Step 3-1.

The present invention also provides an apparatus for solidifying a radioactive waste accompanying chlorine recycling or radioactive iodine removal, the apparatus including: an ingot input unit 1 configured to input a radioactive waste ingot; a first crusher (jaw crusher) 2 configured to firstly crush the ingot input from the ingot input unit 1; a second crusher (roll mill) 3 connected to the first crusher to secondly crush the radioactive waste crushed firstly; a powder container 4 connected to the second crusher 3, in which radioactive waste powders obtained by the second crushing are stored; a powder transfer unit 5 provided at one side of the powder container 4 to transfer the radioactive waste powders stored in the powder container 4; a mixing/dehalogenating unit connected to one side of the powder transfer unit 5 to dehalogenate the radioactive waste powder transferred through the powder transfer unit 5 under the presence of oxygen and mix the dehalogenated radioactive waste powder with a glass medium; a sintering container 7 connected to the mixing/dehalogenating unit 6 to harden a mixture obtained from the mixing/dehalogenating unit 6; a sintering container transfer unit 8 connected to the sintering container 7 to transfer the mixture hardened by the sintering container 7; a high-temperature sintering unit connected to the sintering container transfer unit 8 to sinter the mixture powder transferred from the sintering container transfer unit 8 at a high temperature to thus produce a solidified body; a first halogen removing unit 11 connected to the mixing/dehalogenating unit (6) through a filter 10 to remove a halogen gas generated in the mixing/dehalogenating unit 6 by using an adsorbent material; a second halogen removing unit 12 connected to the first halogen removing unit 11 to completely remove a halogen gas not removed by the first halogen removing unit 11 by using alkali metal carbonate; valves a, b, c, d and e provided between the first crusher 2 and the second crusher 3, between the second crusher 3 and the powder container 4, between the powder transfer unit and the mixing/dehalogenating unit 6, and between the mixing/dehalogenating unit 6 and the sintering container 7; a dust removing unit 13 configured to open the valves a, b, c, d and e to remove a generated dust; a vacuum pump 14 connected to the dust removing unit 13; hoppers 15a, 15b and 15c storing the radioactive waste ingot used in the ingot input unit 1, and a dehalogenating material and the glass medium used in the mixing/dehalogenating unit 6; and an oxygen supply unit 16 configured to supply oxygen introduced into the mixing/dehalogenating unit 6.

The method and apparatus for solidifying radioactive waste according to the present invention provide a method and apparatus for treating radioactive waste composed of volatile metal halide with high corrosiveness at a high temperature through a solidifying system including crushing, mixing/dehalogenating and sintering. In the inventive method and apparatus for solidifying radioactive waste, a dehalogenation process is performed on highly corrosive metal salt under an oxidizing atmosphere by using a method of controlling a temperature on the surface of a reactor, and solidification is carried out by removing radioactive iodine while reusing chlorine contained in an exhaust gas. Accordingly, the generated amount of total waste can be reduced, and therefore the inventive method and apparatus can be usefully used in preparing a solidified body with high durability.

BRIEF DESCRIPTION OF THE DRAWINGS

The above and other objects, features and other advantages of the present invention will be more clearly understood from the following detailed description taken in conjunction with the accompanying drawings, in which:

FIG. 5 is an image of a solidified body prepared through sintering by using borosilicate glass or lead phosphate glass according to an embodiment of the present invention;

DESCRIPTION OF THE PREFERRED EMBODIMENTS

Figure 1:
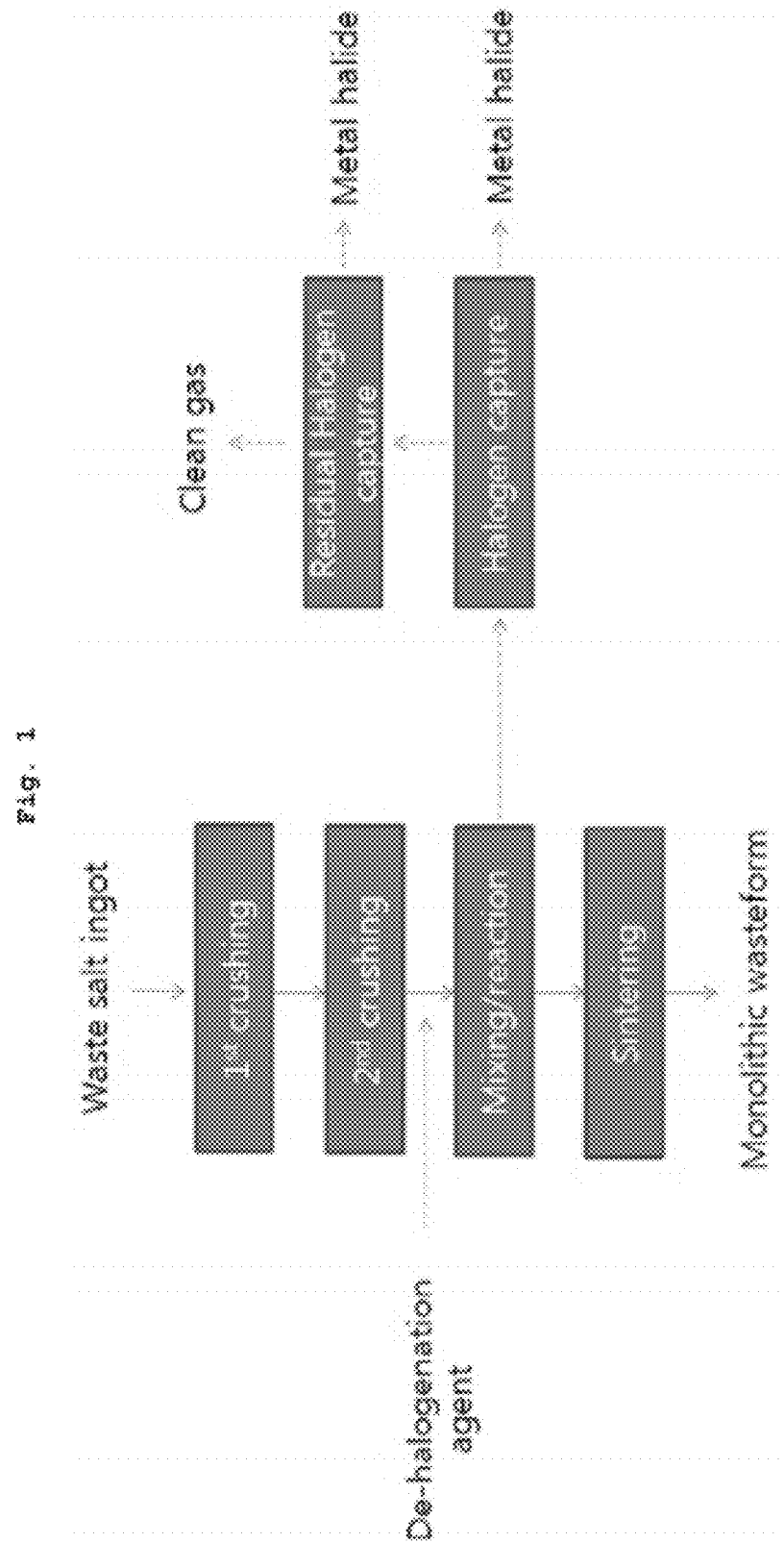
FIG. 1 is a process flow diagram illustrating solidification of radioactive waste and treatment of an exhaust gas according to an embodiment of the present invention.

Hereinafter, the present invention will be described in detail,

The present invention provides a method for solidifying a radioactive waste accompanying chlorine recycling or radioactive iodine removal, the method including: firstly crushing a radioactive waste ingot (Step 1); secondly crushing the radioactive waste crushed in Step 1 (Step 2); mixing a radioactive waste powder obtained by crushing the radioactive waste in Step 2 with a dehalogenating material to generate a halogen gas (Step 3-1); recovering the halogen gas generated in Step 3-1 in the form of a metal halide by using an adsorbent material (Step 3-2); again recovering a residual halogen gas in the form of a metal halide by using molten alkali metal carbonate (Step 3-3), after recovering the halogen gas in the form of the metal halide in Step 3-2; and sintering a remaining material (Step 4), after the halogen gas is volatized in Step 3-1.

Hereinafter, the present invention will be fully described for each step.

While PWR oxide nuclear fuel is being converted to metal, an alkali nuclide such as Cs/Sr and trace rare earth nuclides exist in metal salts such as LiCl and LiCl—KCl and thus become radioactive waste.

During the recovery of uranium, plutonium, or the like from SFR metal nuclear fuel in an electrolytic refining/smelting bath, a radioactive nuclide such as Cs, Sr, rare earth, Tc, and iodine remains in LiCl—KCl electrolyte, and thus become radioactive waste. During such a procedure, a radioactive nuclide in metal salt is left in an electrolyte, and metal chloride containing it is recycled in the form of an ingot, which is a target to be solidified in the present invention.

Step 1 and Step 2 according to the present invention respectively correspond to first and second crushing steps of the radioactive waste ingot. The first crushing of Step 1 may be performed using a jaw crusher, and the second crushing of Step 2 may be performed using a roll mill. When salt powders have an average particle size of 100 μm or less, dehalogenation may be performed at an appropriate reaction rate.

Furthermore, Step 3-1 according to the present invention is a step of generating a halogen gas by mixing a dehalogenating material and the radioactive waste powders which are crushed in the second crushing.

The dehalogenating material in Step 3-1 uses an inorganic composite consisting of oxides such as $SiO_2$, $Al_2O_3$, $Fe_2O_3$, $P_2O_5$, and $B_2O_3$, which are named SAP, and may be prepared through a sol-gel process using TEOS (tetraethyl orthosilicate), $H_3PO_4$, $AlCl_3$, $FeCl_3$, $H_3BO_3$ as a raw material. Specifically, the dehalogenating material is prepared by following steps of: quantifying the raw materials to an appropriate composition and dissolving the quantified raw materials using water and alcohol at room temperature; mixing the solution and performing gelation and aging at 40-90° C. for 1 day to 7 days; drying the obtained hydrogel at 110° C. or higher; completely removing solvent and unreacted organic substances by performing heat treatment at about 600-700° C.; and crushing the resultant product to have the size of about 100 μm. At this time, the dehalogenation material may consist of 20-50 wt % of $SiO_2$, 5-40 wt % of $Al_2O_3$, 10-35 wt % of $P_2O_5$, 0-10 wt % of $Fe_2O_3$, and 0-10 wt % of $B_2O_3$. Alternatively, transition metal oxide or non-metal oxide may be added to the composition in an amount up to 10 wt %.

A mixing time for mixing the dehalogenating material and the radioactive waste powders is 12 hours or less when the rotation speed of a screw-impeller is at 20 rpm, and the temperature is gradually increased to 350° C. during the mixing process. After the mixing is completed, the dehalogenation may be performed under conditions that the rotation speed of the screw-impeller is decreased to 10 rpm, an oxygen gas is supplied at a rate of 1-20 L/min, and the reaction temperature is increased to 400-700° C. It is preferable that the reaction speed be determined according to the amount of internal reactant and oxygen supply amount. Specifically, surface reaction rate may be adjusted to 14 g/m²/min, if the rotation speed of the screw-impeller is 20 rpm, the surface temperature of a reactor is 650° C., and the oxygen supply amount is 20 L/min. That is, the reaction rate may be adjustable depending on the temperature, the rotation speed of the screw-impeller, and the oxygen supply amount, and the oxygen supply amount may be appropriately set in consideration of a reaction amount.

Furthermore, Step 3-2 according to the present invention is a step of recovering the halogen gas generated in Step 3-1 in the form of metal halide using an adsorbent material.

The adsorbent material in Step 3-2 may preferably use alkali metal oxide, alkali metal hydroxide or alkali metal carbonate. More preferably, $Li_2O$, $Na_2O$ or $K_2O$, may be used as the alkali metal oxide; LiOH, NaOH or KOH may be used as the alkali metal hydroxide; and $Li_2CO_3$, $Na_2CO_3$ or $K_2CO_3$ may be used as the alkali metal carbonate.

The reaction of Step 3-2 may be performed at room temperature, however, it is preferable that the reaction be performed at 100° C. or higher in the case where alkali hydroxide is used as the adsorbent material.

Figure 2:
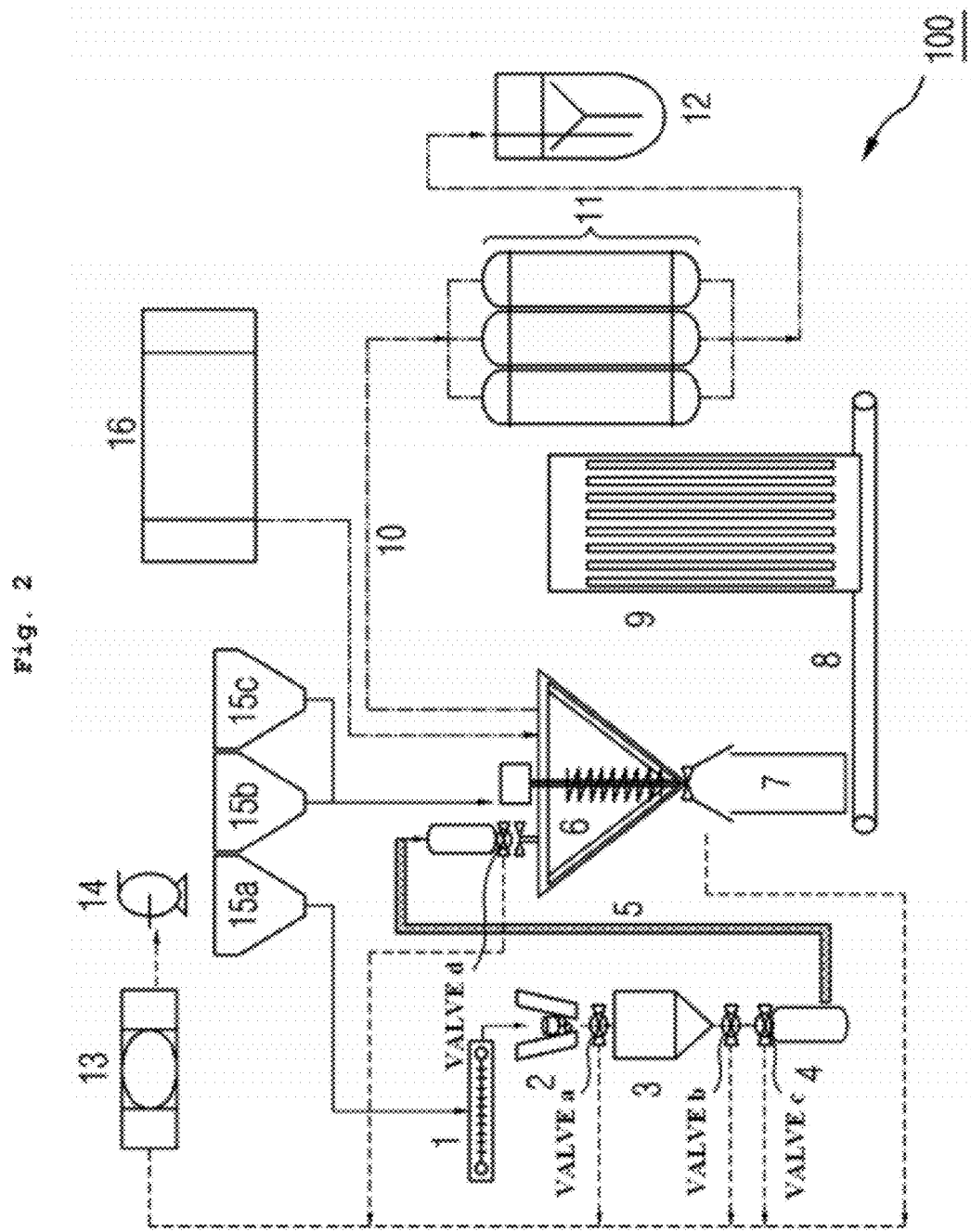
FIG. 2 is a schematic diagram illustrating an overall configuration for the solidification of radioactive waste and the treatment of an exhaust gas according to an embodiment of the present invention.
Figure 9:
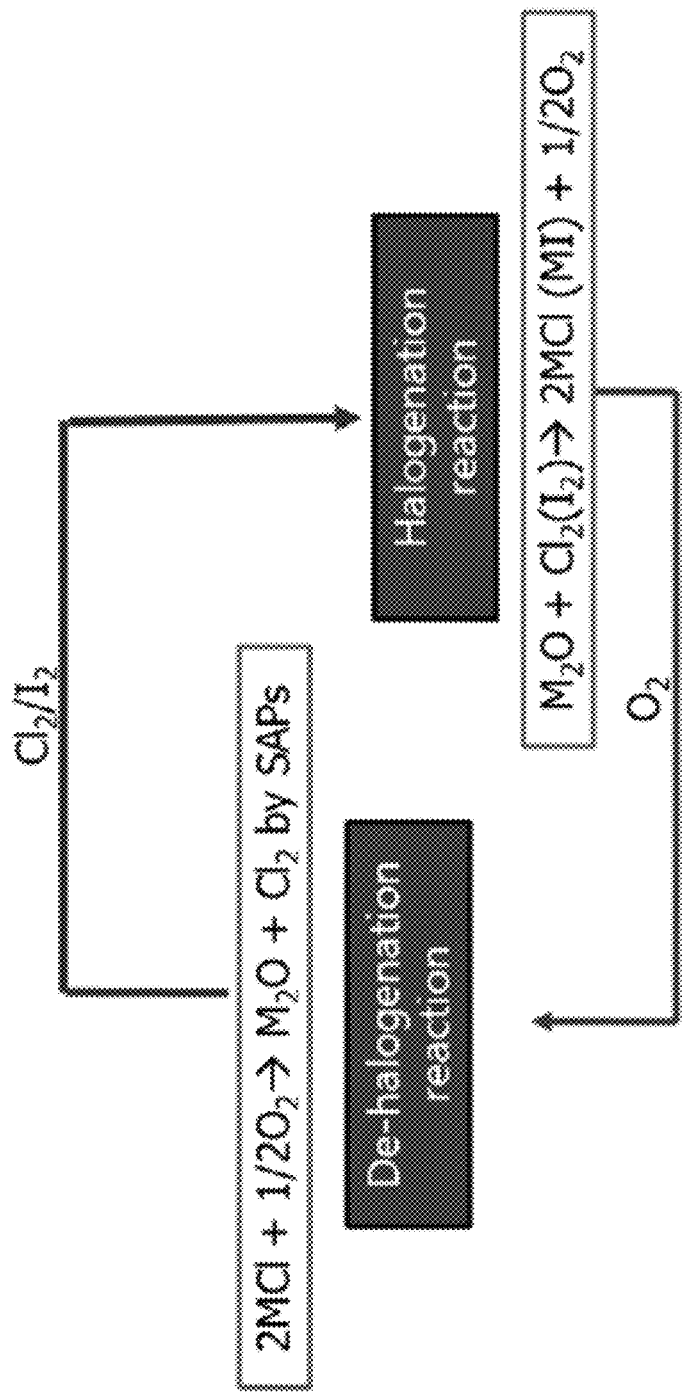
FIG. 9 is a conceptual diagram illustrating a closed system in Step 3-1 and Step 3-2 in a method for solidifying radioactive waste according to the present invention.

Within the range where iodine content in waste salt does not affect a electrolytic process or properties of a product resulting from the electrolytic process, the dehalogenation of Step 3-1 and the halogen gas adsorption of Step 3-2 may be performed in a closed system, as illustrated in FIG. 9. Here, it is preferable that the adsorbent material to be used may be alkali oxide ($Li_2O$ or $K_2O$) which adsorbs halogen and generates only oxygen. Through the closed system, dechlorination may be performed without discharging of radioactive iodine and harmful chlorine gas to the outside, and iodine and chorine may be recovered in the form of LiCl (LiI), KCl (KI) to be reused for the electrolytic process. The reaction can be carried out even at room temperature, and the temperature may be raised in the case of increasing the reaction rate. In a state where a mixing/dehalogenating unit 6 and a first halogen removing unit 11 are connected to each other through a gas line, as illustrated in FIG. 2, about 0.5 to 1 L of oxygen gas for initiating the reaction is injected based on 1 kg of metal chloride, then a gas supply line is blocked off, and thereafter the reaction is carried out. Oxygen gas, which is produced by the reaction between the adsorbent material and the halogen gas, is continuously supplied as oxygen required for dehalogenation.

Step 3-3 according to the present invention is a step of recovering a residual halogen gas again in the form of metal halide using molten alkali metal carbonate, wherein the residual halogen gas is a gas still remaining after the halogen gas is recovered in the form of metal halide in Step 3-2.

Figure 10:
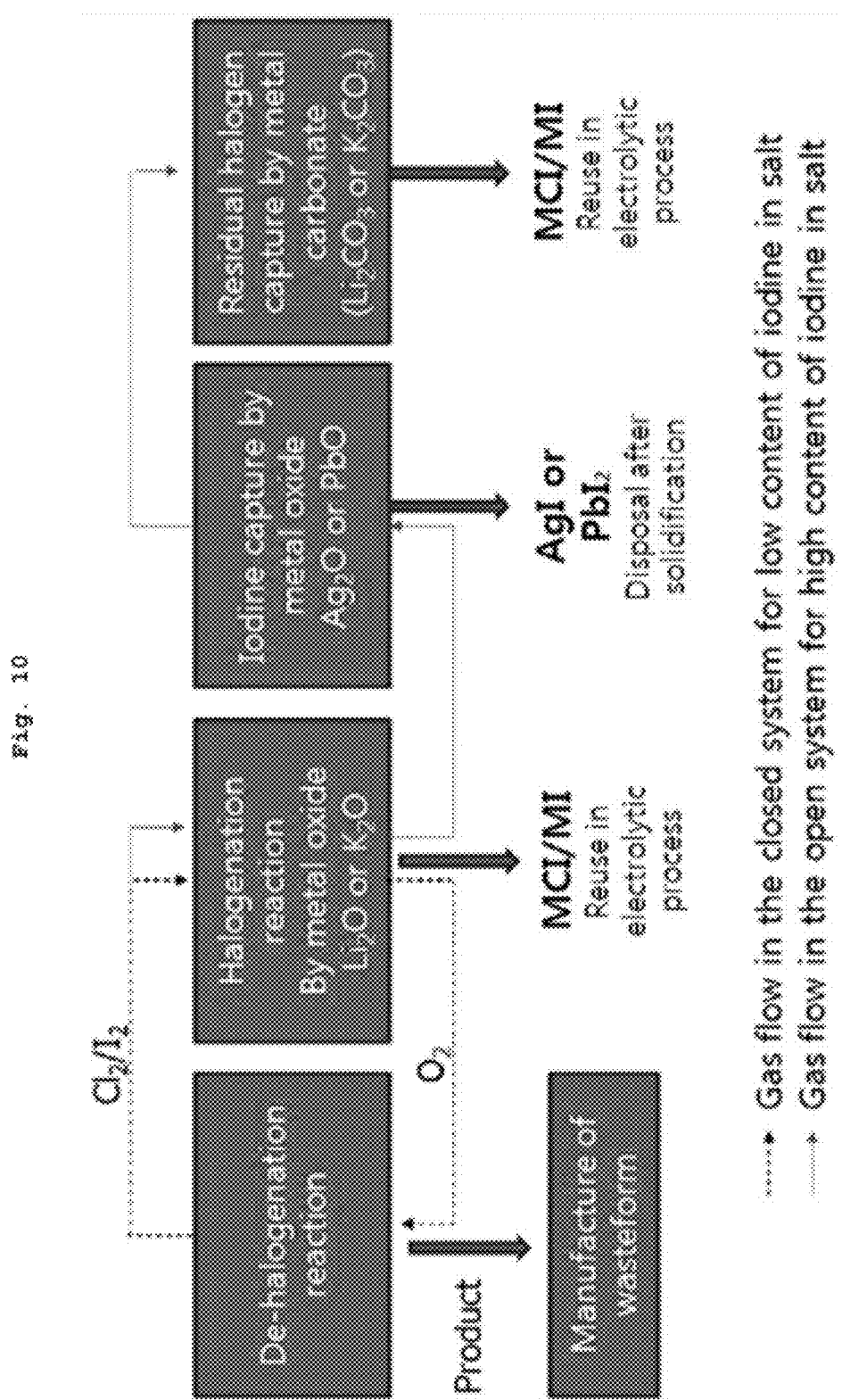
FIG. 10 is a conceptual diagram illustrating procedures of Step 3-1 and Step 3-3 in a method for solidifying radioactive waste according to the present invention.

For reference, procedures of Step 3-1 and Step 3-3 are illustrated in FIG. 10.

As an adsorbent agent for capturing halogen is reused in the electrolytic process by repeating the procedures of Step 3-1 and Step 3-2 in the closed system, the initial amount of radioactive iodine is small but the iodine is gradually accumulated with the repetition of the recovery process up to an amount which is necessary for the iodine to be removed.

In this case, the closed system of Step 3-1 and Step 3-2 is released, and an iodine removing unit is connected to the rear end of an alkali adsorption removing unit. Then, the halogen gas remaining in an exhaust gas passing through the connection may be processed using a solidifying material for iodine removal.

In other words, the procedures of Step 3-1 and Step 3-2 are repetitively performed in the closed system if the iodine content of the radioactive waste is low; however, if the iodine content of the radioactive waste is high, the closed system of Step 3-1 and Step 3-2 is released, and the radioactive iodine removing step may be further performed using a solidifying material for iodine removal which enables radioactive iodine to be removed.

Preferably, the solidifying material used for iodine removal may be AgO, $Ag_2O$, PbO or a mixture thereof.

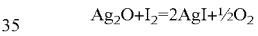

$Ag_2O+I_2=2AgI+½O_2$

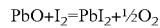

$PbO+I_2=PbI_2+½O_2$

In Step 3-3, only pure oxygen is discharged to the outside by completely removing halogen gas using molten alkali metal carbonate. Preferably, the alkali metal carbonate used in this step may use carbonate containing Li, Na or K, and more preferably, the alkali metal carbonate may be selected depending on the type of metal present in the waste. It is preferable that the reaction temperature of Step 3-3 be performed at 450° C. or higher at which the carbonate to be used for removing halogen has melted. The metal halide, which is recovered or re-recovered through the reaction of Step 3-2 or Step 3-3 may be reused as an electrolyte for a drying process in a drying process of the used nuclear fuel. Resultantly, total amount of the waste can be minimized, and long half-life radioactive iodine can be solidified after separated from the electrolyte.

Furthermore, Step 4 according to the present invention is a step of sintering a material remaining after the halogen gas is volatilized in Step 3-1.

At this time, the sintering process of Step 4 is possible even without input of a glass medium; however, it is preferable to perform the sintering process by additionally inputting a glass medium when the dehalogenating material of Step 3-1 does not contain $Fe_2O_3$ and $B_2O_3$.

The glass medium may selectively use borosilicate glass or lead phosphate glass depending on the reaction weight ratio between metal salt to be dechlorinated and dechlorinating material.

Preferably, borosilicate glass may be used if the reaction weight ratio between the dechlorinating material and the waste metal salt is 2 or more; and lead phosphate glass may be used if the reaction weight ratio between the dechlorinating material and the waste metal salt is 2 or less. However, the present invention does not specifically exclude the possibility of using lead phosphate glass when the reaction weight ratio is 2 or more, and the possibility of using borosilicate glass when the reaction weight ratio is less than 2.

Also, a hardening step may be further performed using a vibrator prior to the sintering of the material remaining after the halogen gas is volatilized, thereby accelerating a sintering reaction during the sintering process.

Furthermore, it is preferable that the sintering temperature be in the range of 1,050 to 1,150° C. when borosilicate glass is used as the glass medium, and be in the range of 900 to 1,050° C. when lead phosphate glass is used.

When borosilicate glass is used as the glass medium, a mixture in which $SiO_2$, $Al_2O_3$, $B_2O_3$, $CaO$, and $Na_2O$ are mixed at an appropriate ratio may be used as the borosilicate glass. Examples of mixing compositions of the borosilicate glass are listed in Table 1 below.

When the mixing ratio of the borosilicate glass is 33 wt % or more, a solidified body has a microstructure in which Si-rich phases shield P-rich phases. On the contrary, when the mixing ratio of the borosilicate glass is less than 33 wt %, a solidified body has a microstructure in which P-rich phases shield Si-rich phases.

Therefore, in the case where borosilicate glass is used as the glass medium, the microstructure of the solidified body may vary with the content of the borosilicate glass.

Also, when lead phosphate glass is used as the glass medium, a mixture in which $PbO$, $Fe_2O_2$, and $P_2O_5$ are mixed at an appropriate ratio may be used as the lead phosphate glass. Examples of mixing compositions of the lead phosphate glass are listed in Table 1 below.

In this case, the solidified body has only a microstructure where P-rich phases shield Si-rich phases.

TABLE 1

| Ingredients of borosilicate glass | Mixing ratio | Ingredients of lead phosphate glass | Mixing ratio |
|---|---|---|---|
| $SiO_2$ | 55.5 | PbO | 53.8 |
| $Al_2O_3$ | 8.3 | $Fe_2O_3$ | 12.2 |
| $B_2O_3$ | 21.5 | $P_2O_5$ | 34.0 |
| CaO | 1.5 | — | — |
| $Na_2O$ | 13.2 | — | — |

Also, the present invention provides an apparatus capable of solidifying radioactive waste accompanying chlorine recycling or radioactive iodine removal.

The apparatus according to the present invention includes: an ingot input unit 1 configured to input a radioactive waste ingot; a first crusher (jaw crusher) 2 configured to firstly crush the ingot input from the ingot input unit 1; a second crusher (roll mill) 3 connected to the first crusher to secondly crush the radioactive waste crushed firstly; a powder container 4 connected to the second crusher 3, in which radioactive waste powders obtained by the second crushing are stored; a powder transfer unit 5 provided at one side of the powder container 4 to transfer the radioactive waste powders stored in the powder container 4; a mixing/dehalogenating unit 6 connected to one side of the powder transfer unit 5 to dehalogenate the radioactive waste powder transferred through the powder transfer unit 5 under the presence of oxygen and mix the dehalogenated radioactive waste powder with a glass medium; a sintering container 7 connected to the mixing/dehalogenating unit 6 to harden a mixture obtained from the mixing/dehalogenating unit 6; a sintering container transfer unit 8 connected to the sintering container 7 to transfer the mixture hardened by the sintering container 7; a high-temperature sintering unit connected to the sintering container transfer unit 8 to sinter the mixture powder transferred from the sintering container transfer unit 8 at a high temperature to thus produce a solidified body; a first halogen removing unit 11 connected to the mixing/dehalogenating unit 6 through a filter 10 to remove a halogen gas generated in the mixing/dehalogenating unit 6 by using an adsorbent material; a second halogen removing unit 12 connected to the first halogen removing unit 11 to completely remove a halogen gas not removed by the first halogen removing unit 11 by using alkali metal carbonate; valves a, b, c, d and e provided between the first crusher 2 and the second crusher 3, between the second crusher 3 and the powder container 4, between the powder transfer unit and the mixing/dehalogenating unit 6, and between the mixing/dehalogenating unit 6 and the sintering container 7; a dust removing unit 13 configured to open the valves a, b, c, d and e to remove a generated dust; a vacuum pump 14 connected to the dust removing unit 13; hoppers 15a, 15b and 15c storing the radioactive waste ingot used in the ingot input unit 1, and a dehalogenating material and the glass medium used in the mixing/dehalogenating unit 6; and an oxygen supply unit 16 configured to supply oxygen introduced into the mixing/dehalogenating unit 6.

Hereinafter, an apparatus for solidifying radioactive waste accompanying chlorine recycling or radioactive iodine removal, according to the present invention, will be described in detail with reference to FIG. 2.

Referring to FIG. 2, in a solidifying apparatus 100 according to the present invention, an ingot is supplied to a radioactive waste ingot input unit 1 from a hopper 15a, and a target to be solidified is supplied to a first crushing unit 2 from the ingot input unit 1.

Radioactive waste powders, which are firstly crushed in the first crushing unit 2, are secondly crushed in a second crushing unit 3. It is preferable that the secondly crushed powders have sizes of about 100 μm.

The secondly crushed powders are contained in a powder container 4 and supplied to a mixing/dehalogenating unit 6 using a powder transfer unit 5. At this time, a dehalogenating material is also input from a hopper 15b.

Figure 3:
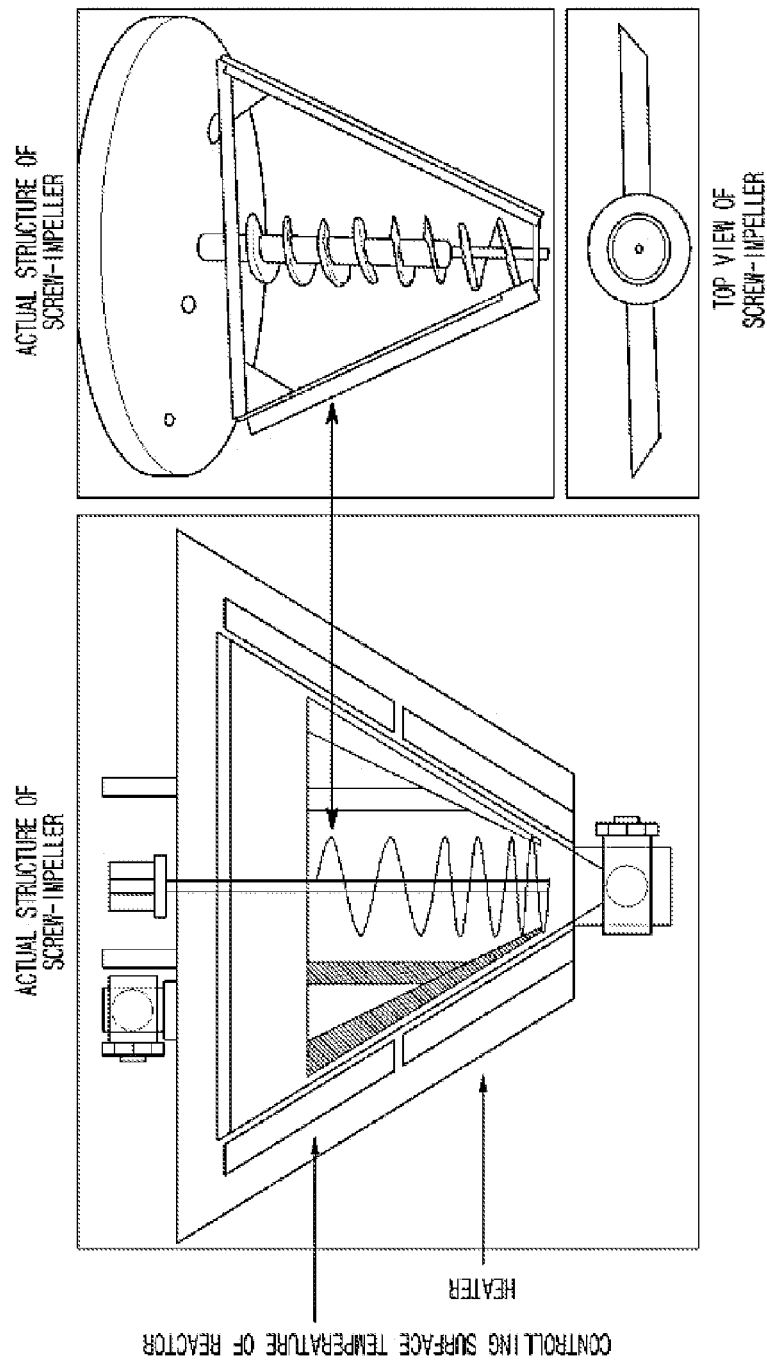
FIG. 3 is a structural diagram of a mixing/dehalogenating device according to an embodiment of the present invention.

The mixing/dehalogenating unit 6 has a structure for allowing highly corrosive alkali metal salt to react at a high temperature under an oxidizing atmosphere, in which a central shaft is composed of a screw to enable the vertical mixing by gravity drop and an impeller is coupled to the central shaft and makes contact with the surface of the reactor thereby enabling the horizontal mixing. Also, the shape of the impeller is offset such that one impeller allows a mixture to be attached to the surface, and concurrently the other impeller allows a reactant to be detached from the surface. By virtue of such a structure, the corrosion of the whole reactor can be minimized and the highly corrosive metal salt can be reacted by lowering the internal temperature of the reactor and controlling only the surface temperature of the reactor (See FIG. 3).

A mixing time taken to mixing the radioactive waste and the dehalogenating material is about 12 hours when the rotation speed of the screw-impeller is 20 rpm. The surface temperature of the mixing/dehalogenating unit 6 is gradually increased up to 350° C. during the mixing process. At the point when the mixing is completed, the rotation speed of the screw-impeller is decreased to 10 rpm, oxygen gas is supplied to the mixing/dehalogenating unit 6 at the flow rate of 1-20 L/min, the reaction temperature is adjusted to 400-700° C., and then the dehalogenation reaction is carried out. The surface reaction rate is determined by the flow rate of the oxygen gas and the amount of internal reactant. The surface reaction rate is about 14 g/m²/min, when the rotation speed of the screw-impeller is 20 rpm, the surface temperature of a reactor is 650° C., and the oxygen supply amount is 20 L/min. The reaction rate may be adjustable depending on the temperature, the rotation speed of the screw-impeller, and the oxygen supply amount, and the oxygen supply amount may be appropriately set in consideration of a reaction amount.

Halogen gases ($Cl_2$, $I_2$) generated during the reaction are removed through first and second halogen removing units 11 and 12 via filters, and consequently, $O_2$ gas in which the halogen gas is completely removed is discharged to the outside.

An adsorbent material used in the first halogen removing unit 11 may include alkali metal oxide ($Li_2O$, $Na_2O$, $K_2O$), alkali metal hydroxide (LiOH, NaOH, KOH), or alkali metal carbonate ($Li_2CO_3$, $Na_2CO_3$, $K_2CO_3$). It is preferable that the adsorbent material be selected depending on types of alkali metal of metal chloride in the waste.

Using the first halogen removing unit 11, most of halogen gas in the exhaust gas may be removed, and metal halide such as LiCl (LiI), NaCl (NaI) and KCl (KI) may be recovered during this procedure. An operation temperature of the first halogen removing unit 11 may be a room temperature, but it is preferable that the operation temperature be 100° C. or higher in the case of using alkali hydroxide.

The second halogen removing unit 12 may remove an exhaust gas with relatively low concentration which is a halogen gas that is not removed by the first halogen removing unit 11. At this time, only pure oxygen should be discharged to the outside by completely removing the halogen gas with molten alkali metal carbonate. The alkali metal carbonate may use carbonate containing Li, Na or K, and preferably, the alkali metal carbonate may be selected depending on the type of metal present in the waste. It is preferable that an operation temperature of the second halogen removing unit 12 may be 450° C. or higher at which the carbonate is melted.

Furthermore, the first halogen removing unit 11 may be designed in such a way of enabling a packed tower for halogen removal in the first halogen removing unit 11 to be replaced with a packed tower in which an adsorbent material for iodine removal is filled to remove radioactive iodine, in the case where radioactive iodine is accumulated in an electrolyte up to an amount which is necessary for the iodine to be removed. Here, it is preferable that the adsorbent material for iodine removal be Ag, AgO, PbO or Ag-loaded zeolite.

Specifically, since the content of iodine is very small in the exhaust gas, the metal halides obtained from the first and second halogen removing units 11 and 12 are reused in a normal process. When radioactive iodine is accumulated up to an amount which is necessary for the iodine to be removed, the first halogen removing unit 11 may be used by filling two- or three-stage packed tower with Ag, AgO, PbO or Ag-loaded zeolite. When the radioactive iodine is removed with AgI or PbI, waste may be solidified into Ag-loaded sodalite or PbI-loaded apatite, and then finally disposed. Preferably, the removal of radioactive iodine under the presence of a chlorine gas may be performed at a low temperature which is lower than the melting point of AgI or PbI by 50° C. As the concentration of the chlorine gas decreases, it is preferable that the operation temperature be lowered to a room temperature.

Figure 4:
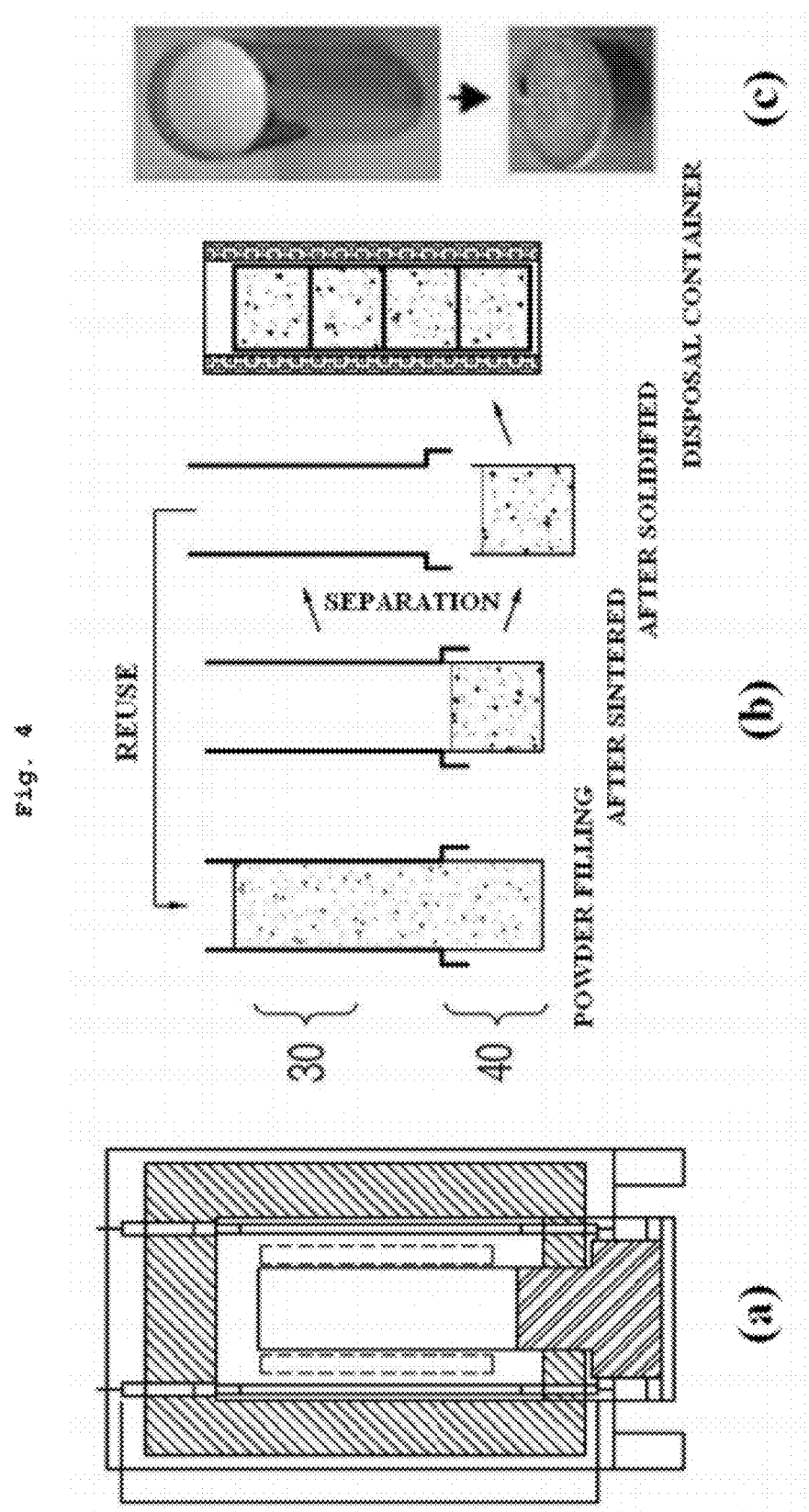
FIG. 4 is a structural diagram of a sintering container according to an embodiment of the present invention.
Figure 6:
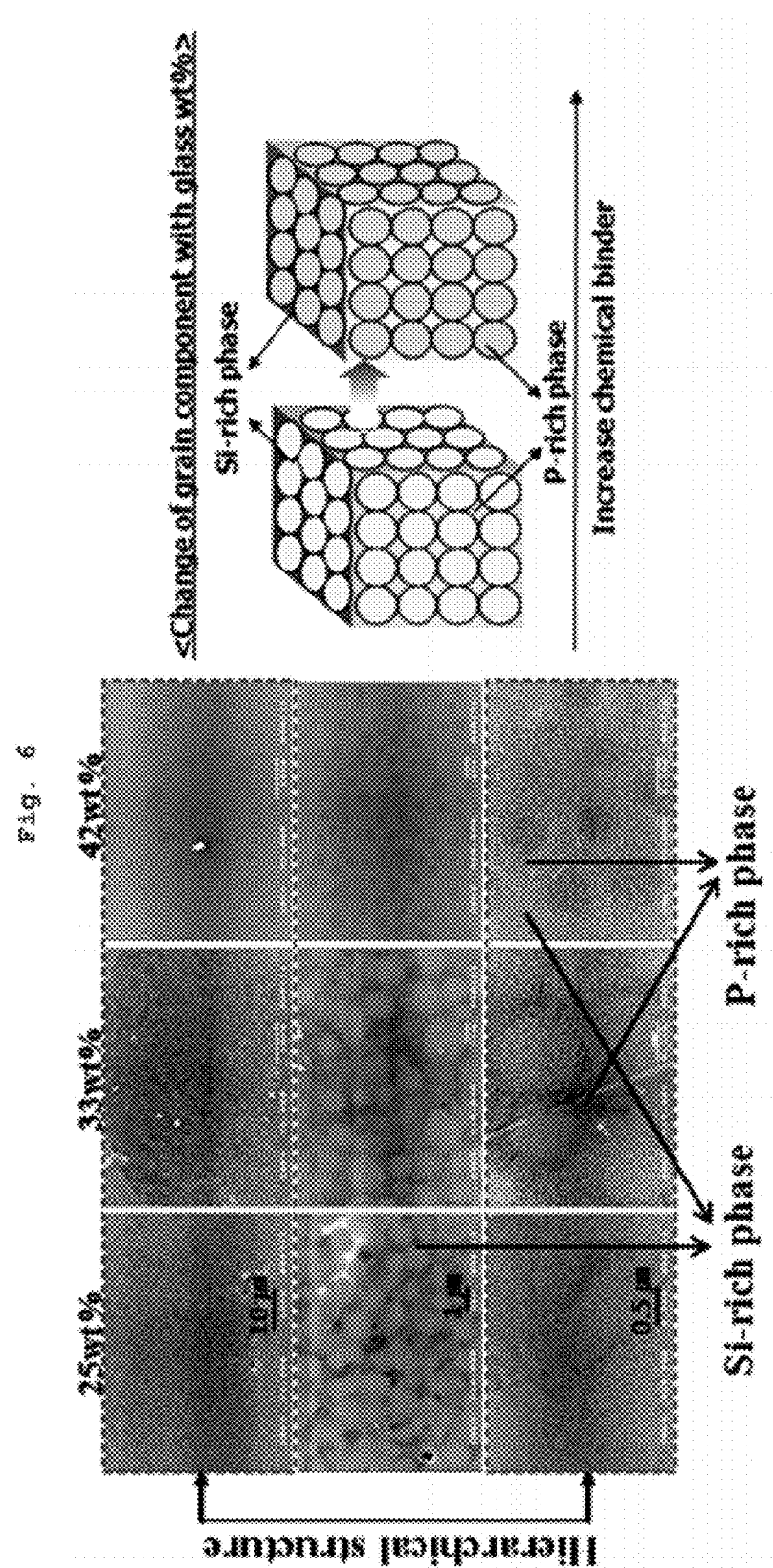
FIG. 6 is an image showing microstructures of solidified bodies having different mixing ratios of borosilicate glass according to an embodiment of the present invention.
Figure 7:
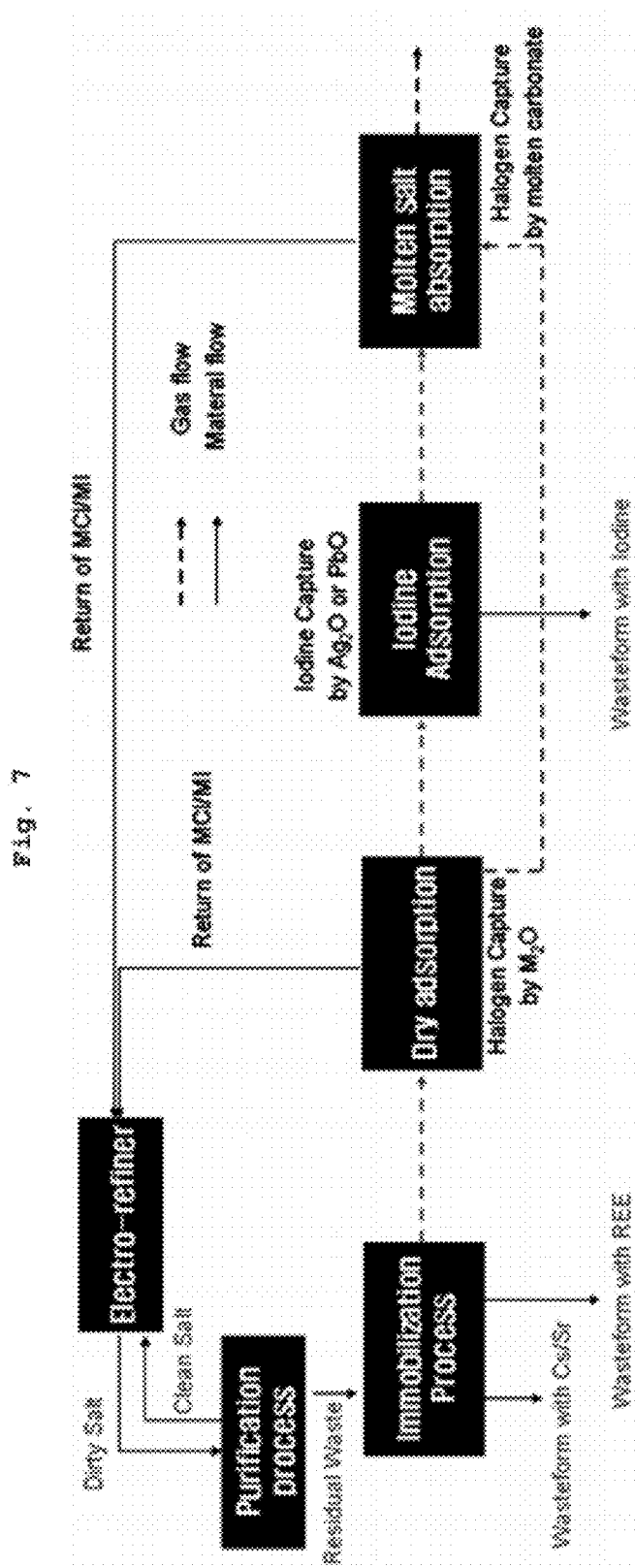
FIG. 7 is a material flow diagram illustrating chlorine recycling and iodine removal through a solidifying system according to an embodiment of the present invention.
Figure 8:
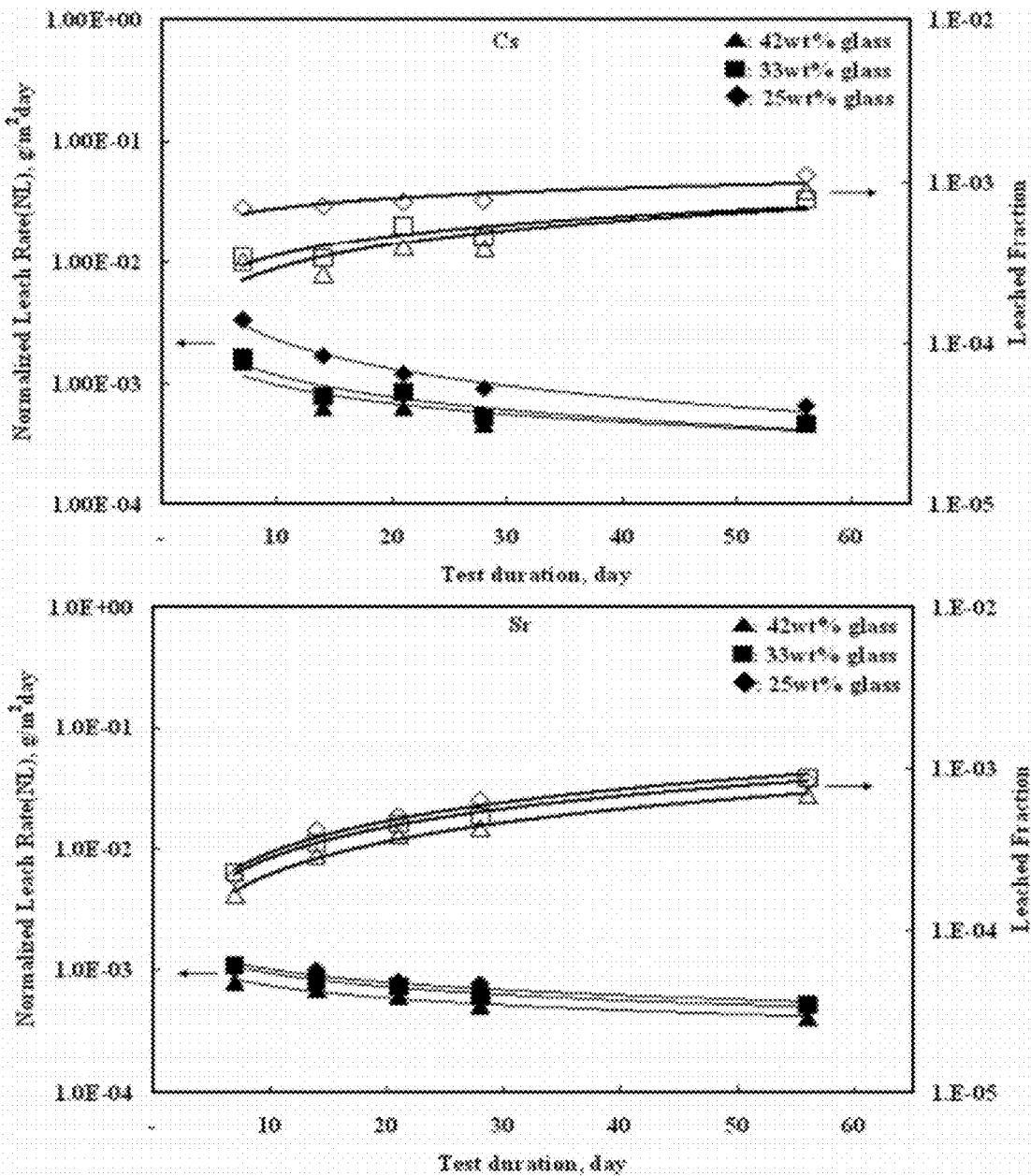
FIG. 8 is a graph showing leaching rate and fraction leached which are obtained by using the PCT-B leaching test according to an embodiment of the present invention.

Further, when the mixing of radioactive waste with the dehalogenating material and the dehalogenation reaction are finished using the mixing/dehalogenating unit 6, the resultant product is output to a sintering container 7. In the case where a glass medium is needed, the glass medium is input to the apparatus from a hopper 15c and mixed for 12 hours or less. At this time, the heating of the reactor is stopped. After being mixed sufficiently, a radioactive waste powder mixture is output to the sintering container 7. The powder mixture is sufficiently hardened in the sintering container 7 using a vibrator or the like. This allows a sintering reaction to be accelerated during the sintering process. The sintering container 4 is shown in detail in FIG. 4. FIG. 4(a) is a front view of the sintering container, FIG. 4(b) illustrates an internal structure of the sintering container, and FIG. 4(c) illustrates a volume change of sintering powder before and after sintered. The sintering container 7 may have a structure where an upper cap 30 is coupled to a lower container 40. The lower container 40 of the sintering container 7 may be separated and finally disposed together with the solidified body of which a volume is reduced by contraction of powders after sintered. The upper cap 30 of the sintering container 7 is reused to minimize the volume of waste due to the sintering container.

After the powder mixture is hardened sufficiently, the sintering container 7 is transferred to a high-temperature sintering unit 9 capable of heating the powder mixture up to 1,500° C. through a sintering container transfer unit 8. Preferably, an operation temperature of the high-temperature sintering unit 9 may be in the range of about 1,000° C. to 1,200° C. when a glass medium is not added, 1,050° C. to 1,150° C. when borosilicate glass is used as a glass medium, and 900° C. to 1,050° C. when lead phosphate glass as a glass medium. A solidified body may be prepared by sintering the powder mixture in the high-temperature sintering unit 9. The durability of the prepared solidified body may be assessed using PCT-B leaching test.

Hereinafter, the present invention will be described in detail according to Examples. However, below-described Examples are merely provided for illustrating the present invention, and thus the present invention is not limited to Examples below.

Example 1

Preparation of Solidified Body Using Borosilicate Glass as Glass Medium

A radioactive waste ingot input from an ingot input unit 1 of a solidifying apparatus 100 according to the present invention was firstly crushed in a first crushing unit 2. The firstly crushed radioactive waste was secondly crushed in a second crushing unit 3. The secondly crushed radioactive waste powders and SAP were mixed at 600-700° C. for 24 hours in a mixing/dehalogenating unit 6. At this time, the SAP used as the dehalogenating material was prepared to have a composition consisting of 30.0 wt % of $SiO_2$, 25.5 wt % of $Al_2O_3$, and 44.5 wt % of $P_2O_5$. A halogen gas generated at this time was removed in a first halogen removing unit 11 using an adsorbent material of LiOH, and a halogen gas which had not been removed yet in the first halogen removing unit 11 was completely removed in a second halogen removing unit 12 using $Li_2CO_3$.

25, 30, 35, and 40 wt % of borosilicate glass was input as a glass medium into radioactive waste powder remaining after the halogen gas was removed, and mixed at room temperature for 12 hours. The powder mixture was hardened in a sintering container 7 using a vibrator. The hardened powder mixture was transferred to a high-temperature sintering unit 9 and then sintered at 1,050° C. A composition of the used dehalogenating material is listed in Table 2, and the solidified body prepared through sintering is shown in FIG. 5.

Example 2

Preparation of Solidified Body Using Lead Phosphate Glass as Glass Medium

As shown in Table 2, the solidified body was prepared in the same manner as Example 1 except that dehalogenating material was used, 10, 15, 20, 25 wt % of lead phosphate glass was input as a glass medium, and a powder mixture was sintered at 1,000° C. A composition of the used dehalogenating material is listed in Table 2, and the prepared solidified body is shown in FIG. 5.

Example 3

Preparation of Solidified Body without Use of Glass Medium

As shown in Table 2, the solidified body was prepared in the same manner as Example 1 except that dehalogenating material containing $Fe_2O_3$ and $B_2O_3$ was used, and a powder mixture was sintered at 1,150° C. without the addition of a glass medium. A composition of the used dehalogenating material is listed in Table 2, and the prepared solidified body is shown in FIG. 5.

TABLE 2

| | Composition of dehalogenating material | | |
| --- | --- | --- | --- |
| Ingredients | Example 1 | Example 2 | Example 3 |
| $SiO_2$ | 30.0 wt % | 35.5 wt % | 42.4 wt % |
| $Al_2O_3$ | 25.5 wt % | 22.6 wt % | 19.6 wt % |
| $Fe_2O_3$ | — | — | 2.7 wt % |
| $B_2O_3$ | — | — | 5.3 wt % |
| $P_2O_5$ | 44.5 wt % | 41.9 wt % | 30.0 wt % |

DESCRIPTION OF REFERENCE NUMERALS

1: Ingot input unit
2: First crushing unit
3: Second crushing unit
4: Powder container
5: Powder transfer unit
6: Mixing/dehalogenating unit
7: Sintering unit
8: Sintering container transfer unit
9: High-temperature sintering unit
10: Filter
11: First halogen removing unit
12: Second halogen removing unit
13: Dust removing unit
14: Vacuum pump
15a: Hopper
15b: Hopper
15c: Hopper
16: Oxygen supply unit

What is claimed is:

1. A method for solidifying a radioactive waste accompanying chlorine recycling or radioactive iodine removal, the method comprising:
   firstly crushing a radioactive waste ingot (Step 1);
   secondly crushing the radioactive waste crushed in Step 1 (Step 2);
   mixing a radioactive waste powder obtained by crushing the radioactive waste in Step 2 with a dehalogenating material to generate a halogen gas (Step 3-1);
   recovering the halogen gas generated in Step 3-1 in the form of a metal halide by using an adsorbent material (Step 3-2);
   again recovering a residual halogen gas in the form of a metal halide by using molten alkali metal carbonate (Step 3-3), after recovering the halogen gas in the form of the metal halide in Step 3-2; and
   sintering a remaining material (Step 4), after the halogen gas is volatized in Step 3-1, wherein the dehalogenating material in Step 3-1 comprises $Fe_2O_3$ and $B_2O_3$.

2. The method of claim 1, wherein the first crushing in Step 1 is performed using a jaw crusher.

3. The method of claim 1, wherein the second crushing in Step 2 is performed using a roll mill.

4. The method of claim 1, wherein the dehalogenating material in Step 3-1 further comprises at least one selected from the group consisting of $SiO_2$, $Al_2O_3$ and $P_2O_5$.

5. The method of claim 1, wherein the adsorbent material in Step 3-2 uses an alkali metal oxide, an alkali metal hydroxide or an alkali metal carbonate.

6. The method of claim 5, wherein the alkali metal oxide is $Li_2O$, $Na_2O$ or $K_2O$, the alkali metal hydroxide is LiOH, NaOH or KOH, and the alkali metal carbonate is $Li_2CO_3$, $Na_2CO_3$ or $K_2CO_3$.

7. The method of claim 1, wherein a reaction temperature in Step 3-3 is 450° C. or more at which a carbonate is melted.

8. The method of claim 1, wherein the metal halide recovered or again recovered in Step 3-2 or 3-3 is reused in an electrolytic process.

9. The method of claim 1, wherein the sintering in Step 4 is performed without additionally adding a glass medium.

10. The method of claim 1, wherein the sintering in Step 4 is performed with additionally adding a glass medium.

11. The method of claim 10, wherein the glass medium uses borosilicate glass or lead phosphate glass.

12. The method of claim 11, wherein the borosilicate glass is used when a reaction weight ratio between a dechlorinating material and a waste metal salt is 2 or more.

13. The method of claim 11, wherein the lead phosphate glass is used when a reaction weight ratio between a dechlorinating material and a waste metal salt is less than 2.

14. The method of claim 1, wherein borosilicate glass is used as a glass medium, and the sintering in Step 4 is performed at a temperature ranging from 1,050° C. to 1,150° C.

15. The method of claim 1, wherein lead phosphate glass is used as a glass medium, and the sintering in Step 4 is performed at a temperature ranging from 900° C. to 1,050° C.

16. The method of claim 1, wherein the content of iodine in the radioactive waste is low, and Steps 3-1 and 3-2 are repeatedly performed in a closed system.

17. The method of claim 1, wherein the content of iodine in the radioactive waste is high, and further comprising releasing a closed system in Steps 3-1 and 3-2 and removing a radioactive iodine by using an iodine removal solidifying material capable of removing the radioactive iodine.

18. The method of claim 17, wherein the iodine removal solidifying material is AgO, $Ag_2O$, PbO or a mixture thereof.

19. The method of claim 1, wherein the method is conducted by an apparatus comprising:
   an ingot input unit (1) configured to input a radioactive waste ingot;

a first crusher (2) configured to firstly crush the ingot input from the ingot input unit (1);

a second crusher (3) connected to the first crusher to secondly crush the radioactive waste crushed firstly;

a powder container (4) connected to the second crusher (3), in which radioactive waste powders obtained by the second crushing are stored;

a powder transfer unit (5) provided at one side of the powder container (4) to transfer the radioactive waste powders stored in the powder container (4);

a mixing/dehalogenating unit (6) connected to one side of the powder transfer unit (5) to dehalogenate the radioactive waste powder transferred through the powder transfer unit (5) under the presence of oxygen and mix the dehalogenated radioactive waste powder with a glass medium;

a sintering container (7) connected to the mixing/dehalogenating unit (6) to harden a mixture obtained from the mixing/dehalogenating unit (6);

a sintering container transfer unit (8) connected to the sintering container (7) to transfer the mixture hardened by the sintering container (7);

a high-temperature sintering unit connected to the sintering container transfer unit (8) to sinter the mixture powder transferred from the sintering container transfer unit (8) at a high temperature to thus produce a solidified body;

a first halogen removing unit (11) connected to the mixing/dehalogenating unit (6) through a filter (10) to remove a halogen gas generated in the mixing/dehalogenating unit (6) by using an adsorbent material;

a second halogen removing unit (12) connected to the first halogen removing unit (11) to completely remove a halogen gas not removed by the first halogen removing unit (11) by using alkali metal carbonate;

valves a, b, c, d and e provided between the first crusher (2) and the second crusher (3), between the second crusher (3) and the powder container (4), between the powder transfer unit (5) and the mixing/dehalogenating unit (6), and between the mixing/dehalogenating unit (6) and the sintering container (7);

a dust removing unit (13) configured to open the valves a, b, c, d and e to remove a generated dust;

a vacuum pump (14) connected to the dust removing unit (13);

hoppers (15a, 15b and 15c) storing the radioactive waste ingot used in the ingot input unit (1), and a dehalogenating material and the glass medium used in the mixing/dehalogenating unit (6); and an oxygen supply unit (16) configured to supply oxygen introduced into the mixing/dehalogenating unit (6).

20. The method of claim 19, wherein the first halogen removing unit (11) is designed in such a way of enabling a packed tower for halogen removal in the first halogen removing unit (11) to be replaced with a packed tower in which a solidifying material for iodine removal is filled to remove radioactive iodine, in the case where radioactive iodine is accumulated in an electrolyte up to an amount which is necessary for the iodine to be removed.

21. The method of claim 20, wherein the solidifying material for iodine removal is AgO, $Ag_2O$, PbO or a mixture thereof.

22. The method of claim 19, wherein the sintering container (7) has a structure in which an upper cap (100) and a lower container (110) are coupled to each other.

23. The method of claim 19, wherein a lower container (110) of the sintering container (7) is separated and finally disposed together with a solidified body of which volume is reduced by contraction of powders after sintered.

24. The method of claim 19, wherein an upper cap (100) of the sintering container (7) is reused.

* * * * *